United States Patent [19]

Lewis et al.

[11] Patent Number: 5,460,236
[45] Date of Patent: Oct. 24, 1995

[54] MANEUVERABILITY VEHICLE

[75] Inventors: David G. Lewis, Cedar Falls, Iowa; Rodney K. Rowland, Brno-Lisen, Czechoslovakia

[73] Assignee: Deere & Company, Moline, Ill.

[21] Appl. No.: 282,374

[22] Filed: Jul. 29, 1994

[51] Int. Cl.⁶ ..................................................... B60K 17/30
[52] U.S. Cl. ........................ 180/267; 180/253; 180/358; 180/900
[58] Field of Search ...................... 180/252, 253, 180/267, 266, 376, 79.3, 79.4, 79, 297, 358, 361; 280/109, 111; 74/413, 421 R

[56] References Cited

U.S. PATENT DOCUMENTS

| | | | |
|---|---|---|---|
| 1,126,960 | 2/1915 | Day | 180/291 |
| 1,506,656 | 8/1924 | Meilike | 180/267 X |
| 1,733,688 | 10/1929 | Ledwinka | 180/367 X |
| 1,876,249 | 9/1932 | Krenzke | 180/353 |
| 1,957,917 | 5/1934 | Storey | 180/79.4 X |
| 2,645,299 | 7/1953 | Vincent | 180/367 |
| 2,960,888 | 11/1960 | Flinn | 475/71 |
| 2,978,054 | 4/1961 | Kraus | 180/364 |
| 3,006,428 | 10/1961 | Westmont | 180/54.1 |
| 3,401,763 | 9/1968 | Rolt | 180/249 |
| 3,664,451 | 5/1972 | Rogers et al. | 180/54.1 |
| 3,679,016 | 7/1972 | Bixby | 180/250 |
| 3,939,936 | 2/1976 | Vinton | 180/233 |
| 4,225,151 | 9/1980 | Taute et al. | 280/661 |
| 4,513,834 | 4/1985 | Hayashi et al. | 180/70.1 |
| 4,924,961 | 5/1990 | Bernardi | 180/374 |
| 5,152,364 | 10/1992 | Woods et al. | 180/292 |

FOREIGN PATENT DOCUMENTS 0690982  4/1940  Germany ................. 180/266

OTHER PUBLICATIONS

John Deere tractor sales brochure "Firepower: 105 to 200 HP Tractors", pp. 14 and 15 (91–02).

Primary Examiner—Mitchell J. Hill
Assistant Examiner—Victor E. Johnson

[57] ABSTRACT

Maneuverability of a work vehicle having front steerable drive wheels is improved by increasing steering clearance. The front drive axle is pivoted to the vehicle for pivotal movement about a fore-and-aft extending oscillation centerline located above the lateral centerline of the axle. The drive shaft is in substantially collinear alignment with the oscillation centerline. The axle has an input shaft that is below and in substantially parallel alignment with the oscillation centerline and is substantially perpendicular to the lateral centerline of the axle. The drive shaft and the input shaft are drivingly connected by intermeshing drive and driven gears mounted on the drive and input shafts, respectively.

7 Claims, 4 Drawing Sheets

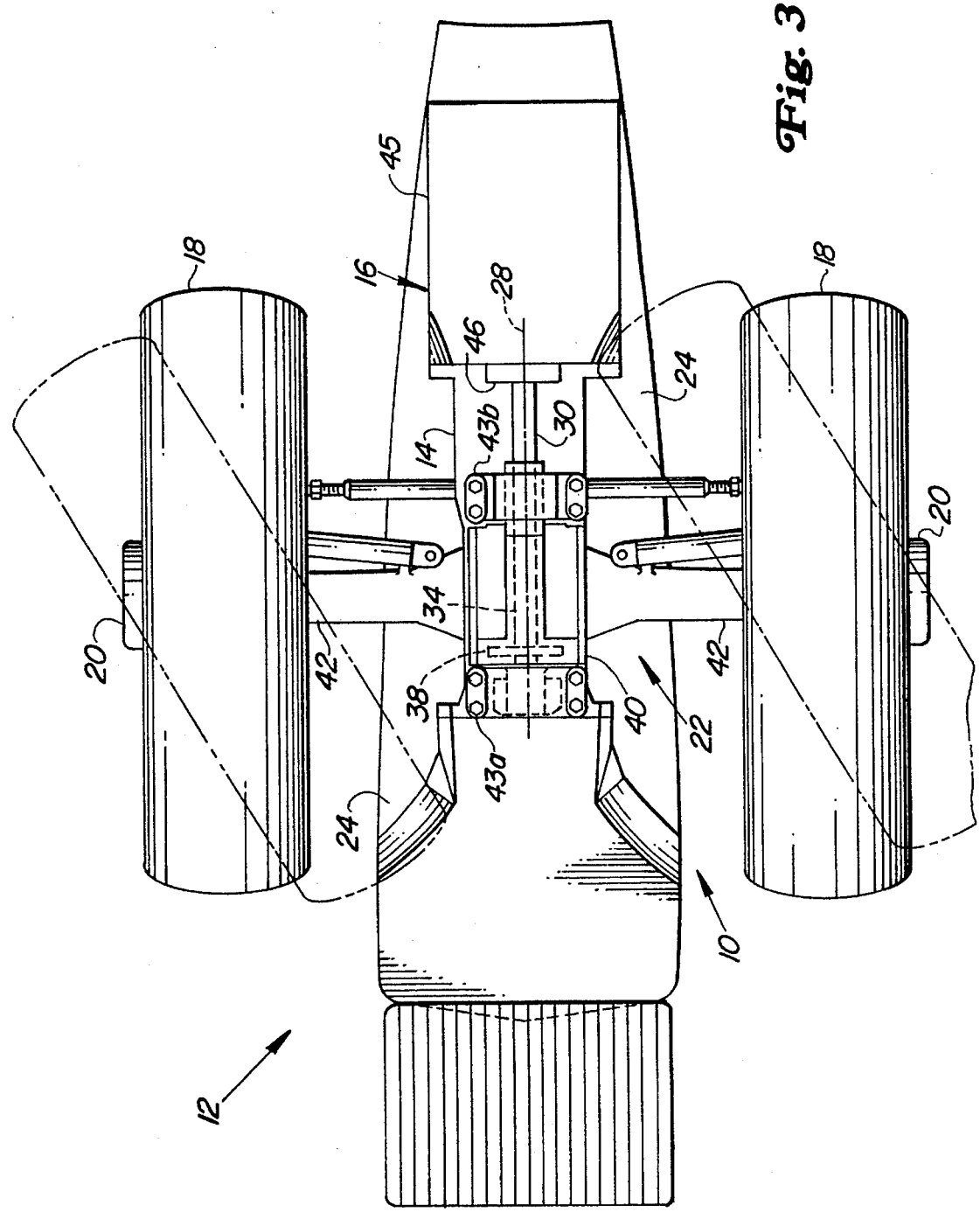

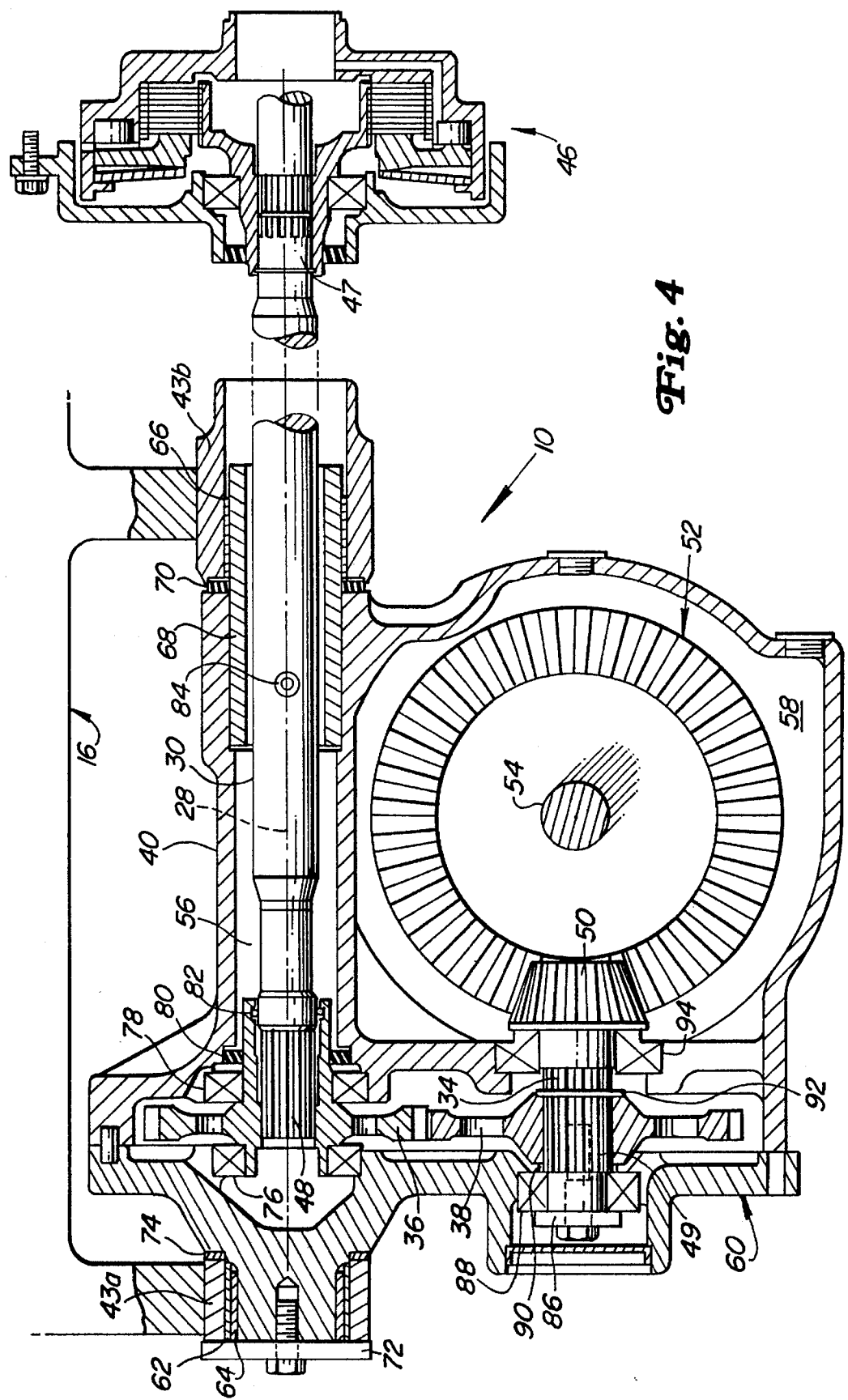

MANEUVERABILITY VEHICLE

TECHNICAL FIELD

The invention relates generally to work vehicles such as agricultural tractors, and more particularly to agricultural tractors with improved maneuverability.

BACKGROUND ART

Planting, cultivation, and other crop-growing practices require precise maneuverability of tractors in narrow crop rows. Many tractors with mechanical front wheel drive (MFWD) and large front wheels suffer from poor maneuverability.

In order to assist the rear wheels, the typical tractor with MFWD includes a front axle pivoted to a forward portion of the tractor frame for oscillation about a fore-and-aft axis or an oscillation centerline. The axle includes a housing that supports differential gearing and oppositely extending axle drive shafts. At its outer opposite ends, the axle has steering knuckles that are supported by the driven front wheels and permit turning of the driven front wheels. If large wheels are used on the front axle, maximum turn is generally unduly restricted by tractor design and construction. Such a restriction may include potential abutting against the frame of the wheel or a fender mounted on the knuckle for movement with the wheel. For example, the John Deere 4755 tractor, manufactured by Deere & Company, has large front wheels that are restricted at maximum turn by the body or frame of the tractor.

Power from the engine is delivered to the front axle through a drive shaft that extends between the front axle and a rearwardly positioned transmission. The drive shaft typically is provided with a U-joint at each of its ends in order to compensate for misalignment caused by oscillation of the front axle. The space requirements stemming from inclusion of the U-joint exacerbate any restriction on clearance for the front wheels at maximum turn, particularly at maximum oscillation of the axle. Furthermore, the drive shaft may need shielding that occupies additional space and further restricts turning clearance of the wheels.

Maneuverability of tractors may be improved by increasing turning clearance of the wheels and enhancing visibility from the cab past the axle to the ground. An early design for increasing the maneuverability of MFWD tractors is shown in U.S. Pat. No. 4,225,151 wherein the steerable front wheels are provided with a large caster angle so that the wheels tilt upon turning and can tuck under the tractor frame. However, even with this tucking action, the turning radius of tractors was still limited, particularly during maximum oscillation.

Furthermore, U.S. Pat. No. 5,152,364 discloses an improved tractor design wherein an increased turning clearance is provided by mounting the engine above the axle in a spaced relationship and positioning the radiator far enough forward of the engine to define a volume into which even large wheels can be turned during steering. Nevertheless, the wheels may be restricted at maximum turn during maximum oscillation by the positioning and size of the drive shaft for the front axle and its associated shielding.

Even with the improvements which have been made in the maneuverability of work vehicles such as agricultural tractors, it is still desirable to provide more improvements in maneuverability.

SUMMARY OF INVENTION

One object of the invention is to improve maneuverability of tractors.

Another object is to increase wheel turning clearance for tractors.

A further object of the invention is to reduce lateral space requirements for transmitting drive to an oscillating axle.

According to the present invention, the foregoing and other objects and advantages are attained by the design and arrangement of a front axle for a mechanical front wheel drive work vehicle and a drive shaft for the axle. The front axle includes differential gearing and laterally oppositely extending drive axles supported in a housing that is pivoted to the work vehicle for oscillation about an oscillation centerline located above the centerlines of the drive axles. The drive shaft, which transmits power to the front axle from a rearwardly located multi-speed transmission, is in substantially collinear alignment with the oscillation centerline. An input shaft for the differential gearing is in substantially parallel alignment with the oscillation centerline and is connected in a driving manner to the drive shaft.

Additional objects, advantages, and novel features of the invention will be set forth in part in the description which follows, and in part will become apparent to those skilled in the art upon examination of the following or may be learned by practice of the invention. For example, the invention is described with respect to a tractor, but easily could be used with any of a variety of work vehicles, including nonagricultural work vehicles.

BRIEF DESCRIPTION OF THE DRAWINGS

FIG. 3 is a fragmentary bottom view of the apparatus of FIG. 1 showing the steerable wheels and the longitudinal position of the oscillation centerline.

FIG. 4 is a fragmentary sectional side view of the apparatus of FIG. 1.

DETAILED DESCRIPTION OF THE PREFERRED EMBODIMENT OF THE INVENTION

Figure 1:
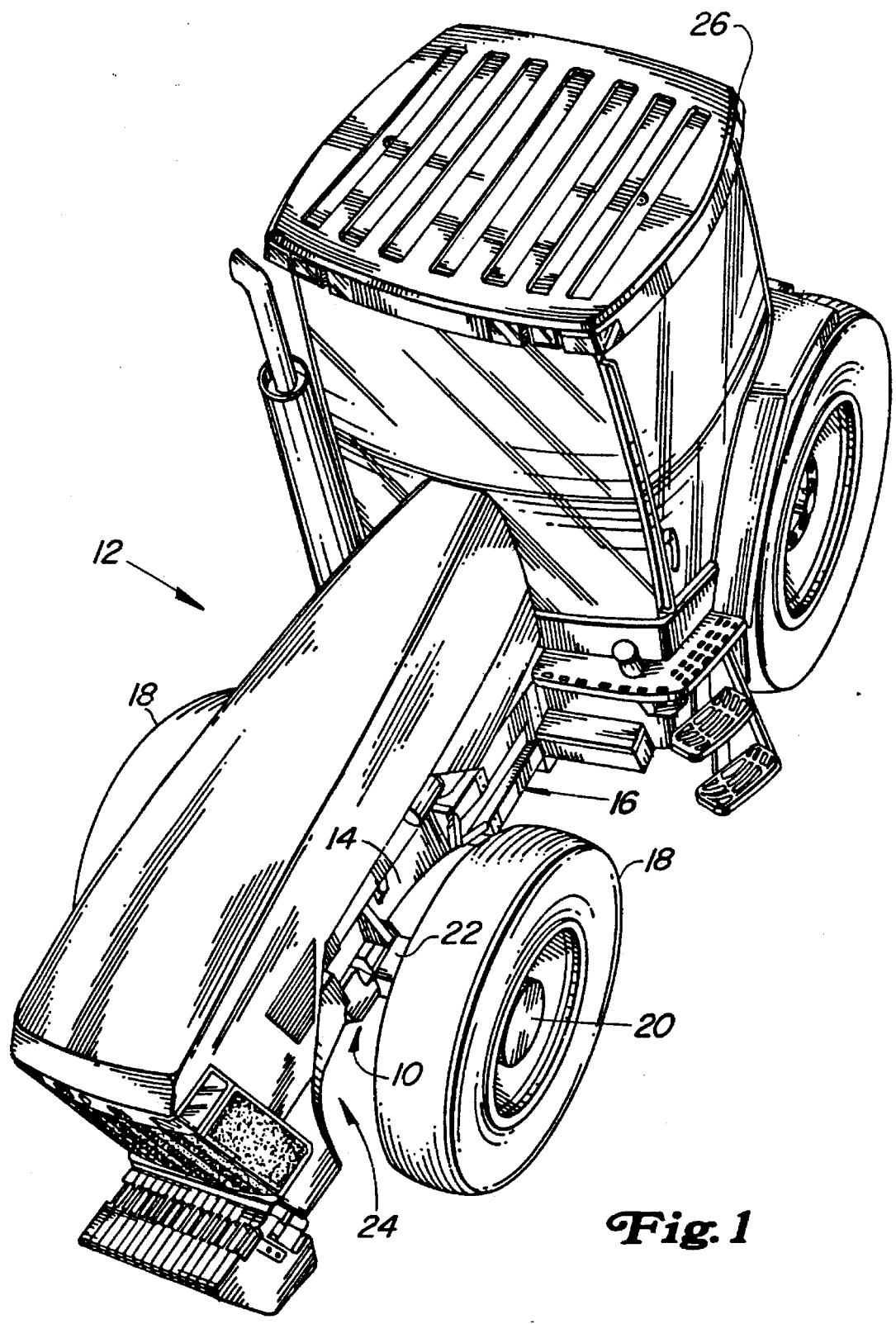
FIG. 1 is a perspective view of an apparatus of an embodiment of the present invention.

As shown in FIG. 1, the present invention is embodied in an apparatus 10 for improving maneuverability of a work vehicle 12. The work vehicle 12 has an engine 14 mounted on a frame 16. For exemplary purposes, the work vehicle 12 is disclosed as an agricultural tractor. Various functional parts of the work vehicle 12, such as the engine 14 and change speed transmission 45, may be utilized to form a portion of the frame 16. A front axle 22 is pivotally connected to the frame 16 beneath the engine 14. The axle 22 is a steerable drive axle and, as will be understood by those skilled in the art, has steering knuckles at its outer ends that carry final planetary drives. Steerable drive wheels 18 are mounted on hubs or ends 20 of the axle 22. The ends 20 are the output of the final planetary drives. The axle 22 includes a housing or differential case 40 that substantially is aligned laterally symmetrically with respect to the oscillation centerline 28. Axle housings 42 are connected to the differential case 40 in a fixed manner, such as by bolts, and extend laterally oppositely therefrom. Although not shown in the drawings but as will be well understood by those skilled in the art, the steering knuckles are carried at the outer ends of the axle housings 42 and the final planetary drives, which include the ends 20, are secured to the steering knuckles.

The axle 22 includes differential gearing 52 housed in a chamber 58 formed by the differential case 40 and drive axles 54 housed in the respective axle housings 42 (shown in FIG. 4). The outer ends of the drive axles 54 are connected to the final planetary drives through U-joints (not shown). The differential gearing 52 is connected for operation to the output end 50 of a differential input shaft 34.

Figure 2:
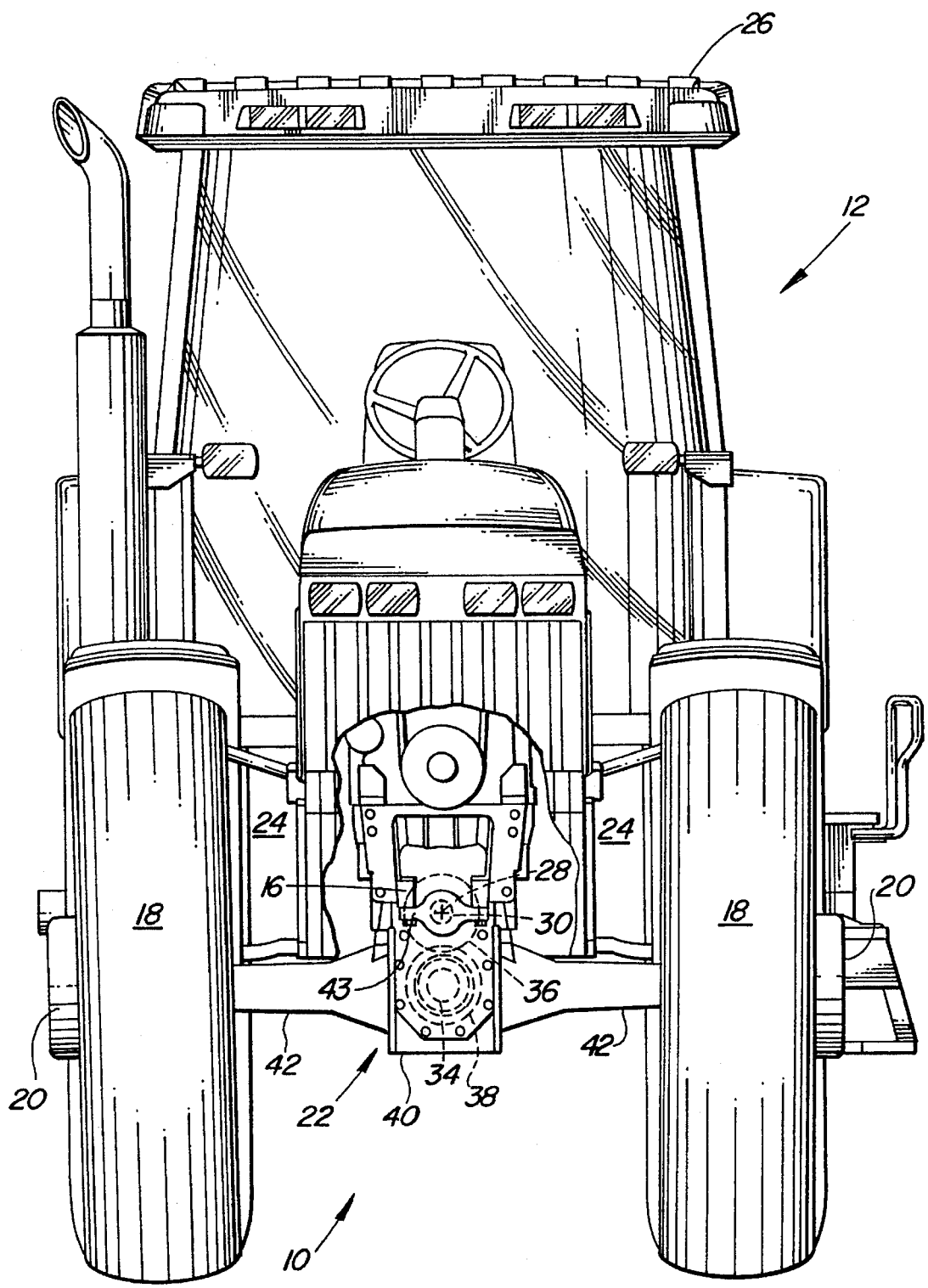
FIG. 2 is a cutaway sectional front view of the apparatus of FIG. 1 showing the vertical position of the oscillation centerline.

As shown in FIGS. 2 and 3, the axle 22 is pivotal about a fore-and-aft oscillation centerline 28. As the work vehicle 12 moves across the ground, particularly uneven ground, the axle 22 pivots about the oscillation centerline 28 so that all four wheels of the work vehicle 12 remain in firm contact with the ground. For this purpose, at least one pivot support 43 is connected to the frame 16 in a fixed manner, such as by bolts as shown in FIGS. 2 and 3. The at least one pivot support 43 preferably includes front and rear pivot blocks or sleeves 43a, 43b that may be bolted to the frame 16 at the front and the rear of the differential case 40 of the axle 22. The pivot sleeves 43a, 43b are front and rear oscillation mounts that attach the axle 22 to the frame 16 for pivotal movement about the fore-and-aft oscillation centerline 28 which is positioned above the centerlines of the drive axles 54.

The front pivot block 43a pivotally receives a projecting boss formed on a cover 60 of the differential case 40. The cover 60 is bolted to the main body of the differential case 40. Preferably, the front pivot block 43a rotatively supports a front bushing 62 that supports a wear sleeve 64 that supports the cover 60. A retainer plate 72 is screwed to the cover 60 and abutted against the front pivot block 43a, the front bushing 62, and the wear sleeve 64. A thrust washer 74 is positioned between the front pivot sleeve 43a and the cover 60.

The rear pivot block 43b preferably pivotally supports a rear bushing 66 that supports a tubular oscillation support 68 that supports the differential case 40. The rear bushing 66, the oscillation support 68, the differential case 40, and the cover 60 cooperate to provide a shaft support that rotatably supports the drive shaft 30.

A bore 56 extends through the upper portion of the differential case 40 in substantially concentric alignment with the oscillation centerline 28. The oscillation support 60 extends into the bore 56 for supporting the axle 22 and is secured therein by pin 84. A seal 70, for instance, made from close celled foam rubber, seals the rear pivot sleeve 43b and the differential case 40.

A drive shaft 30 extends through the oscillation support 60 and the bore 56 in substantially concentric alignment with the oscillation centerline 28. The forward end 48 of the drive shaft 30 is connected in a driving manner to the forward end 49 of the differential input shaft 34 which is supported by the differential case 40 below and substantially parallel to the oscillation centerline 28. Preferably, the differential input shaft 34 is aligned substantially perpendicularly to the drive axles 54 and has at the output end 50 a pinion gear that meshes with the differential gearing 52. The drive shaft 30 is connected in the driving manner to the differential input shaft 34 by intermeshing drive and driven gears 36 and 38, respectively, which are non-rotatably mounted on the shafts 30 and 34, respectively.

Upper front bearing 76 supports the drive gear 36 and the forward end 48 of the drive shaft 30 on the cover 60. Also, upper rear bearing 78 supports the drive gear 36 and the forward end 48 of the drive shaft 30 on the main body of the differential case 40. Oil seal 80 is positioned rear of the upper rear bearing 78 and between the drive gear 36 and the differential case 40. In addition, packing "0" ring 82 is positioned between the drive shaft 30 and the drive gear 36 in order to seal the main interior of the differential case 40 from the bore 56.

The differential input shaft 34 is supported on the cover 60 and the main body of the differential case 40 by lower front bearing 88 and lower rear bearing 94, respectively. The input shaft 34 is held in position by a retainer plate 86 that is screwed to the differential input shaft 34 and abuts against the lower front bearing 88 to pull the pinion gear at the output end 50 into engagement with the lower rear bearing 94. A load ring 90 is positioned on the input shaft 34 between the driven gear 38 and the lower front bearing 88. Further, a snap ring 92 is positioned on the differential input shaft 34 and abuts against the driven gear 38 to hold the driven gear 38 in position against the load ring 90.

The rear end 47 of the drive shaft 30 is connected to a clutch 46 that is part of the change speed transmission 45. Preferably, the case of the transmission 45 is formed structurally so as to make up a portion of the frame 16. Further, the engine 14 and the transmission 45 cooperate structurally so as to make up the frame 16 for purposes of supporting the front portion of the work vehicle 12. A mid-frame (not shown) positioned rearward of the transmission 45 interconnects structurally the transmission 45 and a structural rear axle (not shown).

The input (not shown) of the transmission 45 is, as is conventional, driven by the engine 14 so that the engine power is transmitted to the driven wheels 18 through the transmission 45, clutch 46, drive shaft 30, drive gear 36, driven gear 38, differential input shaft 34, differential gearing 52, and drive axles 54.

Alignment of the drive shaft 30 along the oscillation centerline 28 eliminates the need for a U-joint in the transmission of rotary motion to the axle 22 because the position of the drive shaft 30 is not affected by oscillation of the axle 22. This also places the drive shaft 30 close to the underside of the frame 16, providing good clearance between the ground and the drive shaft 30. Partially because the drive shaft 30 extends through the bore 56, partially because of the elimination of U-joints associated with the drive shaft 30, and partially because of the high clearance of the drive shaft 30 with respect to the ground, the need for shielding of the drive shaft 30 is reduced or eliminated.

Because the drive shaft 30 remains on the oscillation centerline 28 during oscillation of the axle 22 and because of the elimination of U-Joints and shielding associated with the drive shaft 30, the lateral space requirements for transmitting the rotary motion from the transmission 45 to the axle 22 is kept at a minimum. Therefore, the axle 22 may receive power notwithstanding space limitations between the axle 22 and the transmission 45 created by positioning the transmission 45 forward of a cab 26 mounted on the frame 16.

As shown in FIG. 3, the frame 16 is of a reduced width in the area of the engine 14 and defines voids or passages 24 for penetration by the wheels 18 as the wheels 18 are turned and visibility past the axle 22 from the cab 26 which is mounted on the frame 16. The wheels 18 are shown as penetrating the passages 24 in phantom lines in FIG. 3. The reduction in space requirements for the drive shaft 30 avoids interference between the wheels 18 and the drive shaft 30 as the wheels 18 are turned into the passages 24.

The phantom line position of the wheels 18 shown in FIG. 3 assumes the axle 22 is at a centered or level position. As the axle 22 oscillates in either direction, one or the other of the wheels 18, namely, the one of the wheels 18 on the end of the axle 22 which moves up with respect to the frame 16, would normally tend to move closer to and possibly interfere with the frame 16 or another tractor part. However, because the axes of the input shaft 34 and the differential gearing 52 are positioned well below the oscillation centerline 28, oscillation of the axle 22 will result in a lateral shifting of the axle 22 to move the otherwise potentially interfering wheel 18 away from the frame 16. The lateral shifting represents the lateral component of the radial swing or pivot of the axle 22 with respect to the oscillation centerline 28. Of course, the pivot of the axle 22 also includes a vertical component.

The opposite wheel 18, in particular, the one on the end of the axle 22 which moves downward with respect to the frame 16, is already positioned below the tractor frame 16, so its continued downward movement will not cause interference. Also, because of the high position of the drive shaft 30 and its narrow lateral shape, there is no interference between the drive shaft 30 and the wheel 18 as the downwardly swinging wheel 18 shifts downwardly and inwardly with respect to the frame 16. The pivot of the axle 22 is such that at about ten degrees oscillation of the axle 22, the downwardly swinging wheel 18 nearly encroaches on a vertical plane passing through the longitudinal centerline of the work vehicle 12.

Having shown and described a specific embodiment of the invention various obvious modifications of the invention will become apparent to those skilled in the art and can be made without departing from the spirit or scope of the invention. For example, the differential input shaft 34 could enter the differential case 40 from the rear and all the advantages of the invention would be retained. Therefore, the invention should not be limited to the detailed description or the specific illustrations, but only to the fair scope of the following claims.

What is claimed is:

1. In a work vehicle having an engine, a transmission driven by the engine and having an output member, a substantially fore-and-aft extending frame, and an axle positioned below, extending substantially laterally with respect to and pivotally connected to the frame for oscillation about a substantially fore-and-aft extending oscillation centerline, the axle having an input shaft, steerable drive wheels connected operationally at ends of the axle, and a drive shaft having an axis of rotation extending between the output member and the axle; the improvement comprising:

the drive shaft being aligned with its axis of rotation substantially collinearly with the oscillation centerline in a fixed position with respect to the frame and including an output end positioned above the input shaft; and the input shaft being positioned below and aligned substantially parallel to the oscillation centerline, the input shaft including an input end connected drivingly to the output end of the drive shaft; and said steerable drive wheels being pivotally connected to the ends of the axle for pivotal steering movement with respect to the axle.

2. The improvement of claim 1, wherein:

the frame includes portions offset laterally inwardly to define passages for penetration by the respective wheels.

3. The improvement of claim 1, wherein:

the driving connection between the output end of the drive shaft and the input shaft includes intermeshing drive and driven gears mounted on the drive and input shafts, respectively.

4. The improvement of claim 3, wherein:

the axle has a centerline extending laterally with respect to the frame and the input shaft is positioned forward of the lateral centerline of the axle.

5. The improvement of claim 4, wherein:

the input shaft is aligned substantially perpendicular to the lateral centerline of the axle.

6. The improvement of claim 3, wherein:

the axle includes a differential case having a chamber that houses differential gearing, driven by the input shaft, and laterally extending axle housings secured to the differential case and that house drive shafts having inner ends connected to the differential gearing and outer ends drivingly connected to the steerable wheels; and the differential case has a bore extending through an upper portion thereof, the drive shaft extending into and rotatably supported in the bore.

7. The improvement of claim 1, wherein:

the axle has a centerline extending laterally with respect to the frame and the input shaft is positioned forward of the lateral centerline of the axle.

\* \* \* \* \*